UNITED STATES PATENT OFFICE.

JOHN P. COMINS, OF ELIZABETH, NEW JERSEY.

IRON-COATED FIRE-BRICK.

SPECIFICATION forming part of Letters Patent No. 342,066, dated May 18, 1886.

Application filed January 28, 1886. Serial No. 190,133. (Specimens.)

*To all whom it may concern:*

Be it known that I, JOHN P. COMINS, of Elizabeth, in the county of Union and State of New Jersey, have invented certain new and useful Improvements in Iron-Coated Fire-Bricks, of which the following is a full, clear, and exact description.

The object of this invention is to provide, and consists in, fire-bricks coated with iron to prevent the adhesion of clinkers to the surface of the said bricks when in use.

I will describe a convenient and effective method of coating fire-bricks with iron, but do not limit myself to the said method, as the same result may be obtained in various other ways. The fire-bricks, after being burned in the ordinary manner, are painted or covered upon the surfaces to be exposed to the fire with the oxide of iron, preferably, with Prince's metallic paint, and are then subjected in a kiln or suitable furnace to such a degree of heat as will melt the oxide of iron, and thereby change it to metallic iron, so that the said surface of the bricks will receive a coating of iron, which will enter the pores of the said surfaces, and thus be permanently connected with the said surfaces. When bricks thus coated with iron are exposed to coal-fires in the fire-chambers of stoves, ranges, furnaces, and other fire-places, clinkers will not adhere to them, and the fire-bricks will thus be much more durable and much more effective in protecting the walls of such fire-chambers from the heat than ordinary fire-bricks.

Having thus described my invention, what I claim as new, and desire to secure by Letters Patent, is—

As a new article of manufacture, fire-bricks coated with iron, substantially as set forth.

JOHN P. COMINS.

Witnesses:
JAMES T. GRAHAM,
C. SEDGWICK.